United States Patent Office 3,424,569
Patented Jan. 28, 1969

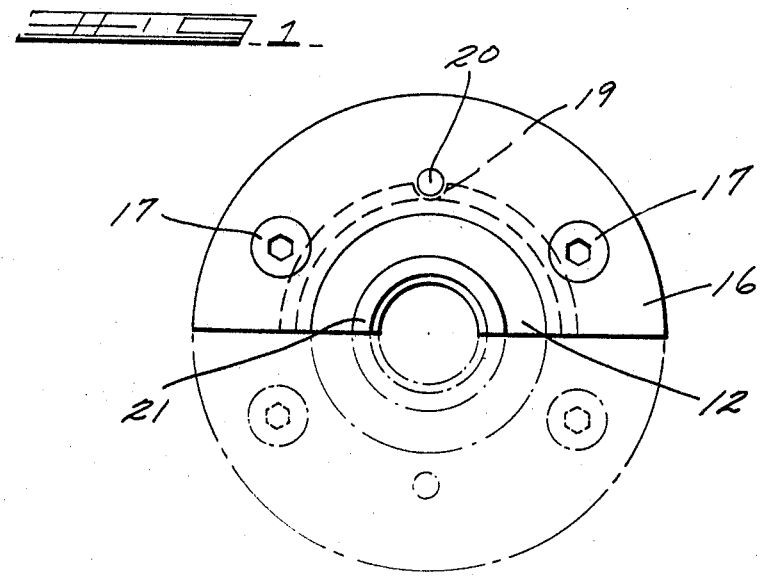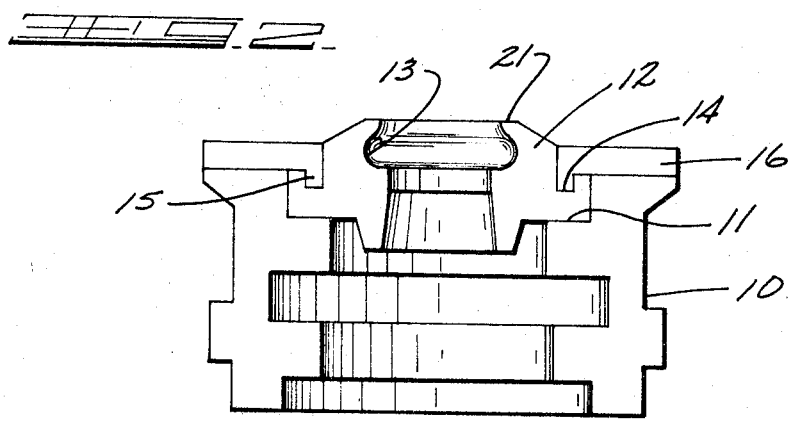

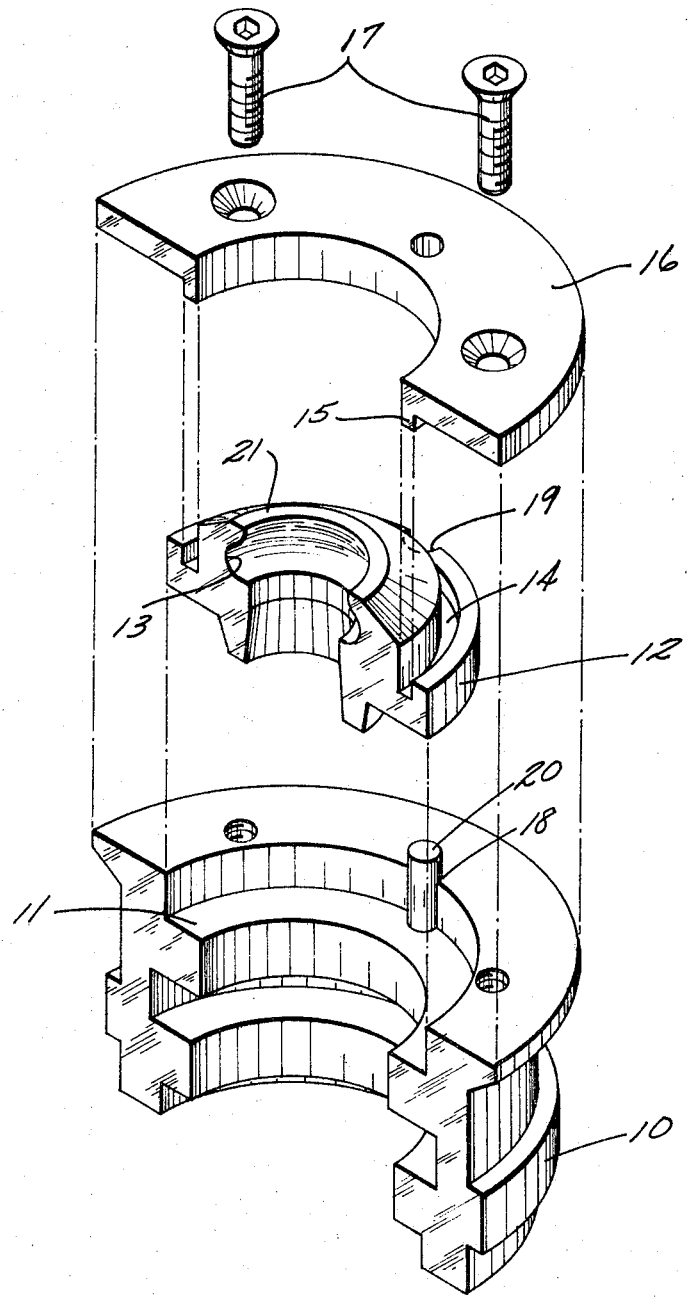

3,424,569
GLASS FORMING CONTAINER NECK RING
Robert J. Huebner, Toledo, Ohio, assignor to Owens-Illinois, Inc., a corporation of Ohio
Filed Nov. 8, 1965, Ser. No. 506,767
U.S. Cl. 65—172     10 Claims
Int. Cl. C03b *11/14*

ABSTRACT OF THE DISCLOSURE

Neck ring or mold apparatus for glass forming machines in which the main body portion of the neck ring is formed of a hardened tool steel with an insert of bronze, cast iron or beryllium-nickel alloy carried by the main body portion, with the insert having good glass forming characteristics.

---

This invention relates to a container neck ring. More particularly, this invention relates to a container neck ring with a replaceable insert which may be economically produced so that replacement rather than refinishing is feasible.

It has been the practice in the past to form neck rings of a single piece of metal, with the ring or mold being used in conjunction with the formation of glass containers, particularly on machines of the Hartford IS type such as disclosed in U.S. Patent No. 1,911,119 of Henry W. Ingle, dated May 23, 1933. Neck rings of this type have always been a compromise between choosing a material for the neck ring which is hard enough to withstand severe abuse during the operating of the machine, yet being of a character that it has good glass release properties.

As will be readily recognized when reading the above-mentioned patent, the parison molds are closed about the split neck rings and engage the neck rings on each cycle of the operation of the forming machine; thus considerable wear of the neck rings is attributed to this intermittent sliding and clamping movement of the parison mold in relation to the neck mold.

With this in view, it would be desirable to form the neck rings of a hardened tool steel since this material is capable of being machined to specification without requiring additional machining during the life of the neck ring; however, hardened tool steel is expensive and relatively hard to machine. Softer material, such as cast iron, bronze or other metals are relatively inexpensive to machine and exhibit better thermal conductivity properties than hardened tool steel. However, they are subject to mechanical abrasion to such an extent that their life expectancy would be relatively short. Thus it has been the practice to select a material for the neck ring which is a compromise between machine-ability and wear resistance.

With the foregoing in view, applicant has found that a neck ring made of air hardened tool steel for the main body portion of the neck ring and an insert of bronze, cast iron or beryllium-nickel alloy exhibits those properties which are most desirable in a neck mold.

Therefore, it is an object of this invention to form a neck ring of two pieces, one of which has superior mechanical abrasion resistance, while the glass contacting piece has superior glass forming characteristics.

It is a further object of this invention to make a neck ring of "air hardened tool steel" and having an insert carried thereby which is made from bronze, cast iron or beryllium-nickel.

It is a further object of this invention to form a neck mold of an outer body portion of hardened tool steel with a glass contacting insert carried thereby which is formed of a metal having good thermal conductivity, thermal stability, glass release properties, and resistance to oxidation and corrosion.

Other and further objects will be apparent from the following description taken in conjunction with the annexed sheets of drawings, wherein:

FIG. 1 is a top plan view of one-half of the neck mold of the invention;
FIG. 2 is a side elevational view of the neck mold half of FIG. 1; and
FIG. 3 is an exploded perspective view of the neck mold of the invention.

With reference to FIGS. 1–3, the neck mold of the invention comprises a main body member 10 having a generally semicylindrical configuration. It should be understood that the body member 10 will cooperate with an identical mold half to form a complete neck mold or ring. The body member 10 is provided with an internal shoulder 11. The shoulder 11 is adapted to receive and support an insert 12. The insert 12 has its inner surface 13 shaped to the desired configuration of the neck portion of the glass bottle to be formed therein. The insert 12 is provided with an annular recess 14 extending circumferentially thereof within which an annular boss 15 of a cover member 16 is adapted to be seated. The cover member 16 is fixed to the upper surface of the body member 10 by a pair of machine screws 17. In this manner the insert 12 is held in firm contact with the shoulder 11 of the body member 10.

In order to prevent relative rotation between the insert 12 and the body member 10, a pair of complementary semicylindrical recesses or slots 18 and 19 are provided within which a pin or key 20 is inserted.

During the utilization of neck rings in the formation of glass containers, a considerable amount of wear is experienced in the neck ring, particularly in the surface 21. This is due to the positioning of the parison mold over the neck ring and the attendant sliding or engagement of the parison mold with this portion of the neck ring.

As stated previously, it was the practice to make the entire ring of the single material and the previously used neck rings were somewhat expensive to machine. The expense in these neck rings was due primarily to the time involved in machining relatively hard materials from which the neck rings conventionally had been made.

By applicant's invention, the outer neck ring body is made of a material which should last for a long time and only the insert portion which will be subjected to the greatest amount of wear will have to be discarded. This insert, as stated above, is made of a material such as cast iron, bronze or beryllium-nickel, all of which are relatively easily machined materials. In this manner the inserts may be made in large quantities at relatively low cost and the problem involved in refinishing neck molds may be obviated by discarding the worn insert and replacing it with a new insert. From the standpoint of economics, it is cheaper to supply a new insert than it would be to attempt to machine and refinish presently existing one piece neck rings. Thus, the advantage of using an insert, which is the glass contacting surface of the neck ring, is that applicant may select a material which has superior glass release properties and is easier and cheaper to machine than presently used materials for entire reck rings.

In the use of neck rings on the conventional glass forming machines, it is the practice to periodically spray or dope the neck mold with a lubricant material, principally a graphite suspension in an oily volatile substance. This lubricant flashes when the hot glass comes in contact therewith, leaving a slight graphite coating on the neck ring surface 13.

Repeated contact of this surface by hot glass requires that the material from which the surface is made be corrosion-resistant and resistant to oxidation. Applicant has found that bronze, cast iron and beryllium-nickel alloy have the desirable characteristics, particularly when compared with the conventional materials presently being used for neck molds.

While applicant has specifically disclosed "air hardened tool steel" as the preferred material from which the neck ring body is formed, it should be kept in mind that oil or water quenching steels are equally suitable in service. Oil or water quenching steels, however, would require finishing operations such as grinding to restore low tolerance dimensions after hardened. The "air hardening steels" are more convenient and economical because they have little or no tendency to deform in hardening and components may be finished to size prior to hardening.

Other and further modifications may be resorted to within the spirit and scope of the appended claims.

I claim:

1. In a neck mold for forming the finish portion of a glass article, a pair of substantially semicylindrical outer metallic body members formed of hardened tool steel, each of said members having an internal, recessed shoulder thereon, a pair of semicylindrical metallic neck ring inserts, said inserts being formed of metal selected from the group consisting of bronze, cast iron and beryllium-nickel alloy, said inserts adapted to seat on the shoulders formed in the body members, the internal configuration of said inserts being that of the external finish of a glass article to be formed.

2. The mold of claim 1, wherein said body member is made of air hardened tool steel.

3. The mold of claim 2, wherein said insert is formed of bronze.

4. The mold of claim 2, wherein said insert is formed of cast iron.

5. The mold of claim 2, wherein said insert is formed of beryllium-nickel alloy.

6. The mold of claim 2, further including a retainer cover of tool steel for holding the inserts in the shoulders of the body members.

7. The mold of claim 6, further including means interposed the body member and insert for preventing relative rotation thereof when assembled.

8. The mold of claim 7, wherein said means interposed the body member and insert comprises a key and said body member and insert have complementary slots within which the key is seated.

9. The mold of claim 8, wherein said insert is formed of bronze.

10. The mold of claim 8, wherein said insert is formed of cast iron.

References Cited

UNITED STATES PATENTS

| | | | |
|---|---|---|---|
| 2,683,332 | 7/1954 | Litalien et al. | 65—172 |
| 2,757,484 | 8/1956 | Winder | 65—173 X |

DONALL H. SYLVESTER, *Primary Examiner.*

ARTHUR D. KELLOGG, *Assistant Examiner.*

U.S. Cl. X.R.

65—260, 307, 374